United States Patent
Tagansky et al.

(10) Patent No.: US 10,313,559 B2
(45) Date of Patent: Jun. 4, 2019

(54) ROSETTE-FREE PRINTING

(71) Applicant: HP INDIGO B.V., Amstelveen (NL)

(72) Inventors: Boaz Tagansky, Rishon Letzion (IL); Dror Kella, Ness Ziona (IL); David L. Pereira, San Diego, CA (US)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 15/520,306

(22) PCT Filed: Nov. 26, 2014

(86) PCT No.: PCT/US2014/067706
§ 371 (c)(1),
(2) Date: Apr. 19, 2017

(87) PCT Pub. No.: WO2016/085504
PCT Pub. Date: Jun. 2, 2016

(65) Prior Publication Data
US 2017/0339307 A1  Nov. 23, 2017

(51) Int. Cl.
H04N 1/52 (2006.01)
H04N 1/60 (2006.01)
G06K 15/02 (2006.01)
H04N 1/405 (2006.01)

(52) U.S. Cl.
CPC ....... *H04N 1/4058* (2013.01); *G06K 15/1878* (2013.01); *G06K 15/1881* (2013.01); *H04N 1/52* (2013.01); *H04N 1/6008* (2013.01)

(58) Field of Classification Search
None
See application file for complete search history.

(56) References Cited

U.S. PATENT DOCUMENTS

| | | | | |
|---|---|---|---|---|
| 5,055,923 A | * | 10/1991 | Kitagawa | B41M 1/20 101/401.1 |
| 5,107,331 A | | 4/1992 | Collell et al. | |
| 5,124,803 A | * | 6/1992 | Troxel | H04N 1/4058 358/3.07 |
| 5,442,461 A | * | 8/1995 | Levien | H04N 1/4058 358/3.19 |
| 5,751,854 A | * | 5/1998 | Saitoh | G06K 9/46 382/218 |
| 5,808,755 A | * | 9/1998 | Delabastita | H04N 1/52 358/3.17 |
| 6,072,592 A | * | 6/2000 | Ashworth | G03F 5/00 358/1.9 |

(Continued)

FOREIGN PATENT DOCUMENTS

| | | |
|---|---|---|
| EP | 1014207 A1 | 6/2000 |
| EP | 1014686 | 6/2000 |
| EP | 2129100 A2 | 12/2009 |

OTHER PUBLICATIONS

Baqai, Farhan A., et al. "Computer-aided design of clustered-dot color screens based on a human visual system model." Proceedings of the IEEE 90.1 (2002): 104-122.

*Primary Examiner* — Anh-Vinh T Nguyen
(74) *Attorney, Agent, or Firm* — Dierker & Kavanaugh PC

(57) ABSTRACT

In an example implementation, a method of rosette-free printing includes, in a printing device whose color plane misregistration is less than 15 percent of a screen ruling of a halftone screen, printing multiple color planes of a multicolor image using the halftone screen.

11 Claims, 4 Drawing Sheets

(56) References Cited

U.S. PATENT DOCUMENTS

| | | | |
|---|---|---|---|
| 6,081,349 A * | 6/2000 | Ebitani | H04N 1/4056 358/3.19 |
| 6,128,099 A | 10/2000 | Delabastita | |
| 6,272,248 B1 * | 8/2001 | Saitoh | G06K 9/46 382/218 |
| 6,738,162 B1 * | 5/2004 | Martens | B41J 19/16 358/3.29 |
| 7,675,651 B2 | 3/2010 | Wang et al. | |
| 7,898,692 B2 | 3/2011 | Wang et al. | |
| 8,576,451 B2 | 11/2013 | Wang et al. | |
| 8,730,547 B2 * | 5/2014 | Chen | H04N 1/52 358/533 |
| 2002/0171873 A1 | 11/2002 | Chang | |
| 2003/0113096 A1 * | 6/2003 | Taira | G11B 27/105 386/230 |
| 2004/0021883 A1 * | 2/2004 | Sugizaki | H04N 1/4058 358/1.9 |
| 2005/0243340 A1 | 11/2005 | Tai et al. | |
| 2007/0046961 A1 * | 3/2007 | Kashibuchi | H04N 1/52 358/1.9 |
| 2008/0130055 A1 * | 6/2008 | Wang | H04N 1/4058 358/3.06 |
| 2008/0130056 A1 * | 6/2008 | Wang | H04N 1/4058 358/3.06 |
| 2008/0292205 A1 * | 11/2008 | Naganuma | H04N 1/4058 382/269 |
| 2009/0296122 A1 * | 12/2009 | Broddin | H04N 1/4058 358/1.9 |
| 2011/0038008 A1 * | 2/2011 | Wang | H04N 1/4051 358/3.06 |
| 2011/0141525 A1 * | 6/2011 | Ng | H04N 1/40087 358/3.06 |
| 2011/0259219 A1 | 10/2011 | Behrens | |
| 2013/0250362 A1 | 9/2013 | Taya | |

\* cited by examiner

ROSETTE-FREE PRINTING

CROSS-REFERENCE TO RELATED APPLICATION

This application is a U.S. National Stage Application of and claims priority to International Patent Application No. PCT/US2014/067706, filed on Nov. 26, 2014, and entitled "ROSETTE-FREE PRINTING."

BACKGROUND

Imaging devices such as printers and copiers employ various techniques to deposit ink or powdered toner onto print media (e.g., paper) to produce a printed product. Such devices can be designed to produce both monochromatic and multi-colored images. Devices having multi-color capability often use cyan, magenta, yellow and black (CMYK) colors to produce images that can comprise a large color gamut space. In multi-color printing, the image quality depends in part on how the printer combines each of the colors on a page. A screening process is used to generate different color planes, or halftone screens, for each color. Each screen defines a separate dot pattern for each of the color planes, and the screens are combined (i.e., laid on top of each other) to produce the full-color, finished image.

BRIEF DESCRIPTION OF THE DRAWINGS

The present embodiments will now be described, by way of example, with reference to the accompanying drawings, in which.

Throughout the drawings, identical reference numbers designate similar, but not necessarily identical, elements.

DETAILED DESCRIPTION

Figure 1:
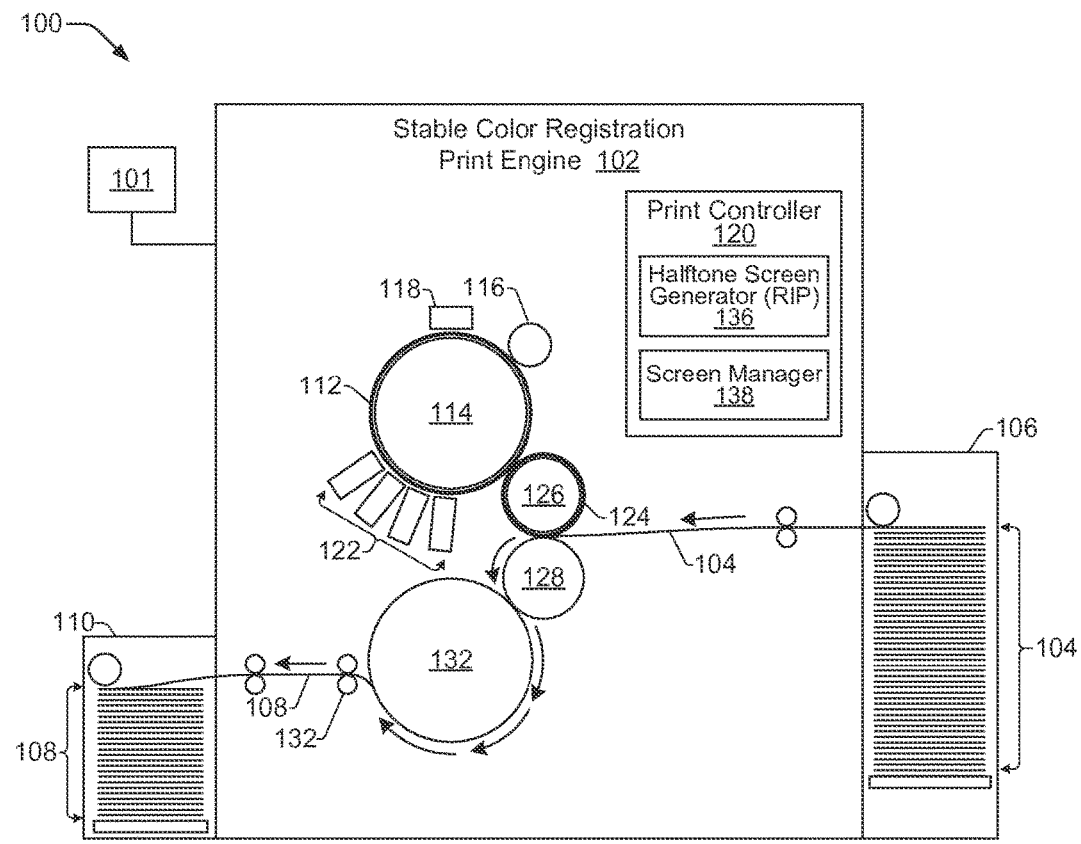
FIG. 1 shows an example of a printing device enabled to provide rosette-free printing.

In multi-color printing, producing an image usually involves overlaying different halftone screens for each of the primary colors (e.g., cyan, magenta, yellow and black-CMYK) to produce an illusion of the full range of colors within the image. Halftoning is the process of generating dots or pixels in a pattern that creates the appearance of a continuous gradation of tone (i.e., from light to dark), such as in shades of gray, color, and image detail. Thus, each halftone screen controls or defines where the printed dots for a different color plane will be placed on the print media. A screen set contains a different screen for each one of the primary colors being printed. When two or more screens are overlaid, the variation in relative positioning between the dots of different colors can cause interactions between the colors resulting in a disagreeable interference called a moiré pattern, or just, a moiré. One source of this variation in relative dot positions is misregistration (i.e., misalignment) between the color planes when the screens are printed. It is common to reduce the moiré interference (i.e., make it smaller) in order to make it less apparent to the human eye, by overlaying the different halftone screens at angles relative to one another. For example, in four-color printing (i.e., CMYK), screens for the three most visible process colors are often overlaid and printed with a 30 degree rotation between them (e.g., C at 105 degrees, M at 75, and K at 45). Because Y is the least visible color, the Y screen is angled at zero degrees (i.e., 15 degrees from C). The reduced moiré pattern that results from overlaying and printing the C, M, and K screens at 30 degree rotations is called a "rosette". In offset printing, the rosettes are small enough to be almost invisible, resulting in smooth images. For digital images, however, the lower addressability and larger dots result in larger rosettes that are more visible. The larger rosettes contribute to an undesirable granular or grainy appearance to the image.

Accordingly, example methods and systems disclosed herein enable the printing of rosette-free images in printing systems that are capable of printing with little or no color plane misregistration. In printers having color plane misregistration on the order of 15% or less of the screen ruling, rosette-free images can be printed using a single screen (i.e., a same screen) to print two or more of the color planes of an image. The screen ruling of an image is the number of printed dots per linear inch measured along the axis of each printed row of the image. Thus, by printing some or all of the primary colors of an image using the same screen, the rosettes are eliminated and the image is inherently smooth.

Screens are considered to be the same when they are designed to have the same halftone dot pattern, and, when they are printed with zero degrees of rotation between one another. Thus, in different examples, dots of a first color plane and dots of a second color plane can be printed using the same halftone screen. For instance, dots of a first color plane can be printed using a halftone screen, and dots of a second color plane can be printed directly on top of the first dots using the same screen. In another instance, dots of a first color plane can be printed using a halftone screen, and dots of a second color plane can be printed at locations that are shifted from locations of the first dots using the same screen.

In an example implementation, a method of rosette-free printing includes, in a printing device whose color plane misregistration is less than 15 percent of a screen ruling of a halftone screen, printing multiple color planes of a multicolor image using the halftone screen.

In another example implementation, a printer for rosette-free printing includes a stable color registration print engine, a screen generator to create a halftone screen, and a screen manager to use the halftone screen for printing at least two color planes of an image. In an example, the stable color registration print engine comprises a print engine to provide a color plane misregistration that is better than 15 percent of a screen ruling of the halftone screen.

In another example implementation, a non-transitory machine-readable storage medium stores instructions for rosette-free printing, that when executed by a processor of a printing device, cause the printing device to generate a first halftone screen, and print at least two color planes of an image using the first halftone screen with a color plane misregistration between the at least two color planes that is better than 15 percent of a screen ruling of the first halftone screen.

FIG. 1 illustrates an example of a printing device 100 enabled to provide rosette-free printing. The printing device 100 comprises a print-on-demand device, implemented as a liquid electro-photography (LEP) printing press 100. While the example printing device 100 is illustrated and discussed herein as being an LEP printing press, there is no intent to limit the printing device 100 to such an implementation. Various other types of printing systems may be suitable and are contemplated herein as candidates to provide rosette-free printing, including dry electro-photography systems, inkjet systems, various impact printing systems, dye sublimation systems, and so on.

Referring to the example device of FIG. 1, an LEP printing press 100 generally includes a user interface 101 that enables the press operator to manage various aspects of printing, such as loading and reviewing print jobs, proofing and color matching print jobs, reviewing the order of the print jobs, and so on. The user interface 101 typically includes a touch-sensitive display screen that allows the operator to interact with information on the screen, make entries on the screen, and generally control the press 100. The user interface 101 may also include other devices such as a key pad, a keyboard, a mouse, and a joystick, for example.

The LEP printing press 100 also includes a print engine 102 to receive a print substrate, illustrated as print media 104 (e.g., cut-sheet paper or a paper web) from a media input mechanism 106, and to perform a printing process. After the printing process is complete, the print engine 102 outputs the printed media 108 to a media output mechanism, such as a media stacker tray 110. In general, the printing process is controlled by a print controller 120 to generate the printed media 108 using digital image data that represents words, pages, text, and images that can be created, for example, using electronic layout and/or desktop publishing programs. Digital image data can be formatted as one or multiple print jobs that are stored and executed on the print controller 120, as discussed below with reference to FIG. 2.

In the example LEP printing press 100, the printing process enables rosette-free printing in part through the print engine 102 which provides a very stable color plane registration. The stable color plane registration print engine 102 provides a minimized degree of misregistration (i.e., misalignment) between the color planes. In printing devices having a stable color registration, the relative shifting of different color planes can be disregarded. This enables the selection of a single screen, and the repeated use of the same, single screen for all or some of the colors, as discussed further below. In multi-color printing systems, misregistration between color planes, or color separations, can be caused by a variety of mostly mechanical factors, such as the timing and coordination of lasers and photoconductors in the print engine that form an image on the print substrate. Color plane registration is typically calibrated by characterizing the misregistration between color planes and then making appropriate adjustments within the print engine to correctly register the color planes. Unfortunately, perfect color plane registration is difficult to achieve. However, the print engine 102 in example LEP printing press 100 comprises a 'stable color registration print engine' 102 capable of providing color plane misregistration that is as good as or better than about 15% of the screen ruling. The screen ruling is the number of lines or dots per inch on a halftone screen, discussed below in more detail. Thus, in order to achieve rosette-free printing, the color plane misregistration provided by the stable color registration print engine 102 of the LEP press 100 is no greater than about 15% (i.e., is less than or equal to about 15%) of the screen ruling of the halftone screen used to print each color plane.

The print engine 102 includes a photo imaging component, such as a photoreceptor 112, mounted on an imaging drum 114 or imaging cylinder 114. The photoreceptor 112 defines an outer surface of the imaging drum 114 on which images can be formed. A charging component such as charge roller 116 generates electrical charge that flows toward the photoreceptor surface and covers it with a uniform electrostatic charge. The print controller 120 uses digital image print data and other inputs such as print job and print media parameters, temperature information, and so on, to control a laser imaging unit 118 to selectively expose the photoreceptor 112.

More specifically, the pattern of exposure on the photoreceptor 112 is determined by a halftone screen created by a halftone screen generator 136 of controller 120. In different examples, the halftone screen generator 136 can comprise varying combinations of hardware components such as hardware logic, electronic circuitry, a processor and memory, as well as software and/or firmware components comprising machine-readable instructions stored within the memory and executable by a processor of the controller 120. In one implementation, a halftone screen generator 136 comprises a raster image processor (RIP) engine. The input to the halftone screen generator 136, or RIP, comprises print data in the form of a page description formatted in a high-level page description language such as PostScript, Portable Document Format, XPS or another bitmap. In general, a RIP engine 136 is a component of the printing press 100 that converts a continuous-tone bitmap into a halftone screen (i.e., pattern of dots). Screens from the halftone screen generator 136 are used to control the laser imaging unit 118 to selectively expose the photoreceptor 112 for each color plane or color separation.

Using the dot pattern of a halftone screen, the laser imaging unit 118 exposes image areas on the photoreceptor 112 by dissipating (neutralizing) the charge in those areas. Exposure of the photoreceptor in this manner creates a 'latent image' in the form of an invisible electrostatic charge pattern that replicates the image to be printed. After the latent/electrostatic image is formed on the photoreceptor 112, the image is developed by a binary ink development (BID) roller 122 to form an ink image on the outer surface of the photoreceptor 112. Each BID roller 122 develops one ink color plane of the image, and each developed color corresponds with one image impression. While four BID rollers 122 are shown, indicating a four color process (i.e., a CMYK process), other press implementations may include additional BID rollers 122 corresponding to additional colors. In addition, although not illustrated, print engine 102 also includes an erase mechanism and a cleaning mechanism which are generally incorporated as part of any electrophotographic process.

In a first image transfer, a single color plane impression of the ink image developed on the photoreceptor 112 is transferred from the photoreceptor 112 to an image transfer blanket 124, often referred to as the print blanket 124. The print blanket 124 overlies and is securely fastened to the outer surface of the intermediate transfer media (ITM) drum 126, sometimes referred to as the image transfer drum 126. The first image transfer that transfers ink from the photoreceptor 112 to the print blanket 124 is driven by electrophoresis of the electrically charged ink particles and an applied mechanical pressure between the imaging drum 114 and the ITM drum 126. The blanket 124 is electrically conductive, enabling it to be electrified by an applied bias voltage. The electric field that drives the ink transfer is created by the applied bias voltage.

The print blanket 124 can be heated by both internal and external heating sources such as infrared heating lamps (not shown). Heat from the heated print blanket 124 causes most of the carrier liquid and solvents in the transferred ink image to evaporate. The blanket heat also causes the particles in the ink to partially melt and blend together. This results in a finished ink image on the blanket 124 in the form of a hot, nearly dry, tacky plastic ink film. In a second image transfer, this hot ink film image impression is then transferred to a substrate such as a sheet of print media 104, which is held by an impression drum/cylinder 128. The temperature of the print media substrate 104 is below the melting temperature of the ink particles, and as the ink film comes into contact with the print media substrate 104, the ink film solidifies, sticks to the substrate, and completely peels off from the blanket 124.

This process is repeated for each color plane separation in the image, and in some examples the print media 104 remains on the impression drum 128 until all the color plane separation impressions (e.g., C, M, Y, and K) are transferred to the print media 104. After all the color plane impressions have been transferred to the sheet of print media 104, the printed media 108 sheet is transported by various rollers 132 from the impression drum 128 to the output mechanism 110.

Figure 2:
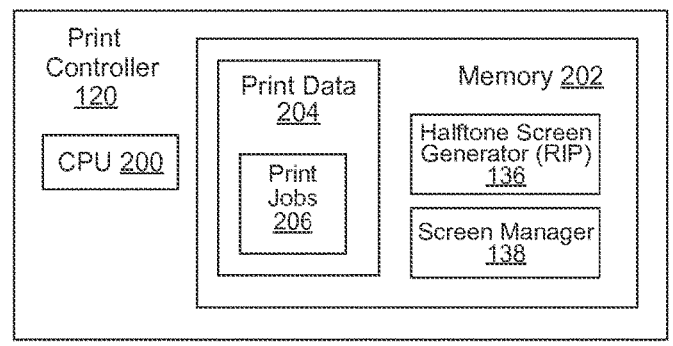
FIG. 2 shows a box diagram of an example print controller suitable for implementing within a printing device to provide rosette-free printing.

FIG. 2 shows a box diagram of an example print controller 120 suitable for implementing within an LEP printing press 100 to provide rosette-free printing. Referring to FIGS. 1 and 2, print controller 120 generally comprises a processor (CPU) 200 and a memory 202, and may additionally include firmware and other electronics for communicating with and controlling the other components of print engine 102, the user interface 101, and media input (106) and output (110) mechanisms. Memory 202 can include both volatile (i.e., RAM) and nonvolatile (e.g., ROM, hard disk, optical disc, CD-ROM, magnetic tape, flash memory, etc.) memory components. The components of memory 202 comprise non-transitory, machine-readable (e.g., computer/processor-readable) media that provide for the storage of machine-readable coded program instructions, data structures, program instruction modules, JDF (job definition format), and other data for the printing press 100, such as modules 136 and 138. The program instructions, data structures, and modules stored in memory 202 may be part of an installation package that can be executed by processor 200 to implement various examples, such as examples discussed herein. Thus, memory 202 may be a portable medium such as a CD, DVD, or flash drive, or a memory maintained by a server from which the installation package can be downloaded and installed. In another example, the program instructions, data structures, and modules stored in memory 202 may be part of an application or applications already installed, in which case memory 202 may include integrated memory such as a hard drive.

As noted above, print controller 120 uses digital image data and other inputs to control the laser imaging unit 118 in the print engine 102 to selectively expose the photoreceptor 112. More specifically, controller 120 receives digital print data 204 from a host system, such as a computer, and stores the data 204 in memory 202. Data 204 represents, for example, documents or image files to be printed. As such, data 204 forms one or more print jobs 206 for printing press 100 that each include print job commands and/or command parameters. Using a print job 206 from data 204, print controller 120 controls components of print engine 102 (e.g., laser imaging unit 118) to form characters, symbols, and/or other graphics or images on print media 104 through a printing process as has been generally described above with reference to FIG. 1.

As mentioned above, the LEP printing press 100 is enabled to provide rosette-free printing. One feature of press 100 that facilitates rosette-free printing is the minimal color plane misregistration provided by the stable registration print engine 102 (i.e., having color plane misregistration no greater than about 15% of the screen ruling). Rosette-free printing is further enabled by a screen manager 138 of print controller 120. Screen manager 138 comprises executable instructions to control the application of halftone screens created by halftone screen generator 136 to different color planes. For example, to enable print engine 102 to generate rosette-free print media 108, screen manager 138 can apply the same halftone screen from screen generator 136 to two different color planes, such as the cyan, C, and magenta, M, color planes. That is, the screen manager 138 uses a single halftone screen to print two different color planes of an image. Thus, the screen manager 138 can print two different color planes using a single halftone screen having the same dot pattern with no rotation of the screen between the two color planes. In some examples, the screen manager 138 can also use the same, single screen to print more than two different color planes. In other examples, the screen manager 138 can use the same, single screen to print all of the color planes of a printed image, such as the C, Y, M and K, color planes.

Figure 3:
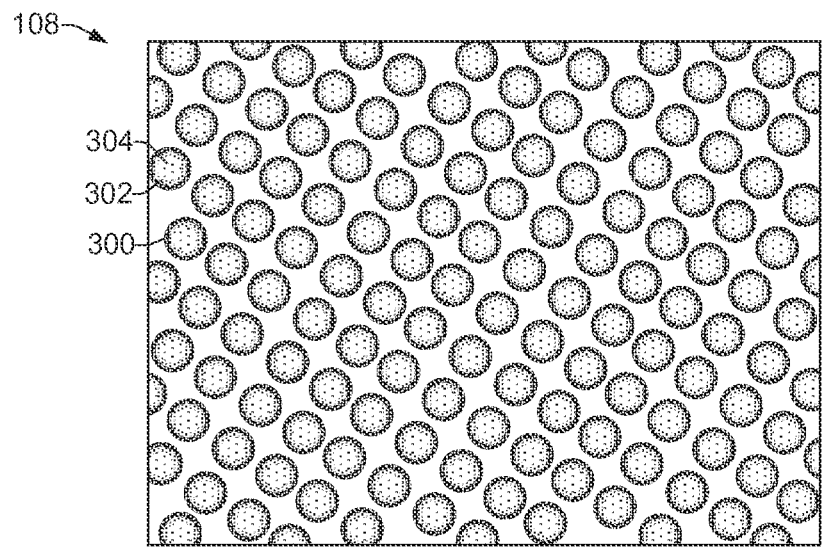
FIG. 3 shows an example representation of a rosette-free print media from a print engine where a single screen has been used to print three color planes.

As just noted, screen manager 138 can print two or more different color planes using a single halftone screen such that each color plane screen has the same dot pattern and where there is zero degrees of screen rotation between the color planes. Thus, in one implementation, all of the ink dots from the different color planes are printed directly on top of each other. FIG. 3 shows an example representation of a rosette-free print media 108 from print engine 102 where the screen manager 138 has used a single screen to print three color planes. For purposes of illustration, the three color planes are represented by dots of varying darkness and size. Thus, a first color plane is shown as dark dots 300, a second color plane is shown as medium dots 302, and a third color plane is shown as light dots 304. The dots are shown in different sizes (i.e., dark dots 300 largest, and light dots 304 smallest) for the purpose of illustrating that the dots from the different color planes have been printed directly on top of one another using a same, single, halftone screen having a single dot pattern for each color plane and having no rotation of the screens between each color plane. In this implementation, the print is robust to small variations in relative placement between the ink dots. However, the ink usage is not optimal because the inks cover each other, which results in greater contrast with the white of the paper. This contrast results in some remaining granularity in the printed output 108.

Figure 4:
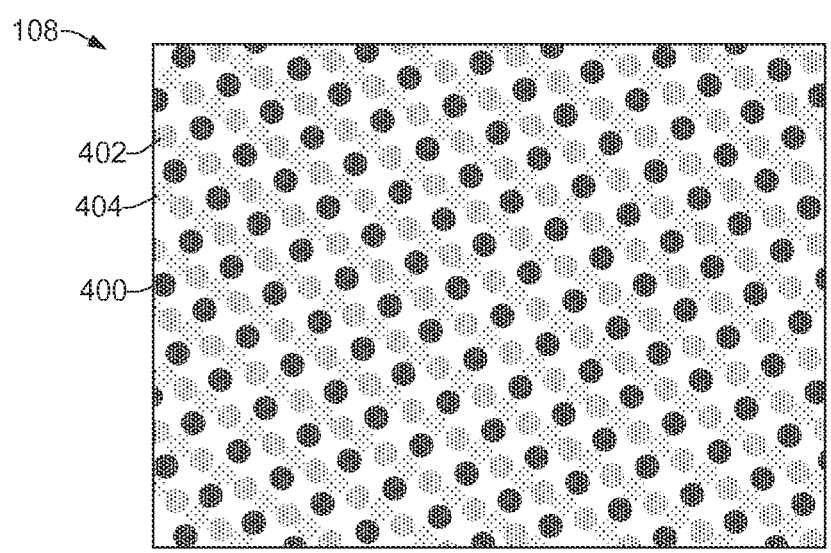
FIG. 4 shows an example representation of a rosette-free print media from a print engine where a single screen has been used to print three color planes, and where the dots from each color plane have been shifted.

In another implementation, the screen manager 138 can print two or more different color planes using a single halftone screen where the dots are not printed directly on top of one another, but are instead, shifted with respect to one another. Shifting the dots provides better coverage of the white areas of the media page than printing the dots directly on top of one another. FIG. 4 shows an example representation of a rosette-free print media 108 from print engine 102 where the screen manager 138 has used a single screen to print three color planes, but where the screen manager 138 has shifted the dots from each color plane to avoid printing the dots directly on top of each other. As in FIG. 3, the three color planes in FIG. 4 are represented by dots of varying darkness. Thus, a first color plane is shown as dark dots 400, a second color plane is shown as medium dots 402, and a third color plane is shown as light dots 404. In this implementation, the ink dots from the different color planes are placed on the media page in different locations, which provides better coverage of the white paper and a less granular appearance in the printed output 108. In a particular example of shifting, a screen built as 4,2 (i.e., on an X,Y grid) can have the first four dots placed at (0,0), (−2,4), (4,2), and (2,6), for a first color, magenta. For cyan, the exact middle of these points can be selected, which are (1,3), (−1,7), (5,5), and (3,9). For black, the average between cyan and magenta can be selected, and for yellow, the other average can be selected (i.e., there are two average combinations).

In some examples, the order in which ink dots from different screens are printed can be altered. Thus, instead of placing all the ink dots on the media in the same order from one color to the next color, the order of dot placement can be changed between the different colors. For example, the first four dots of cyan can be placed in an order of the first dot, followed by the second dot, followed by the third dot, followed by the fourth dot. For magenta, the first four dots can be placed with the fourth dot place first, followed by the third dot placed second, followed by the second dot placed third, followed by the first dot placed fourth. Any variation in dot placement order can be used.

FIGS. 5, 6, 7, and 8 show flow diagrams that illustrate example methods 500, 600, 700, and 800, respectively, related to providing rosette-free printing in a printing device such as LEP printing press 100. Methods 500-800 are associated with the examples discussed above with regard to FIGS. 1-4, and details of the operations shown in methods 500-800 can be found in the related discussion of such examples. The operations of methods 500-800 may be embodied as programming instructions stored on a non-transitory, machine-readable (e.g., computer/processor-readable) medium, such as the memory 202 shown in FIG. 2. In some examples, implementing the operations of methods 500-800 can be achieved by a processor, such as a processor 200 shown in FIG. 2, reading and executing the programming instructions stored in a memory 202. In some examples, implementing the operations of methods 500-800 can be achieved using an ASIC (application specific integrated circuit) and/or other hardware components alone or in combination with programming instructions executable by a processor 200.

In some examples, methods 500-800 may include more than one implementation, and different implementations of methods 500-800 may not employ every operation presented in the respective flow diagrams. Therefore, while the operations of methods 500-800 are presented in a particular order within the flow diagrams, the order of their presentation is not intended to be a limitation as to the order in which the operations may actually be implemented, or as to whether all of the operations may be implemented. For example, one implementation of method 600 might be achieved through the performance of a number of initial operations, without performing one or more subsequent operations, while another implementation of method 600 might be achieved through the performance of all of the operations.

Figure 5:
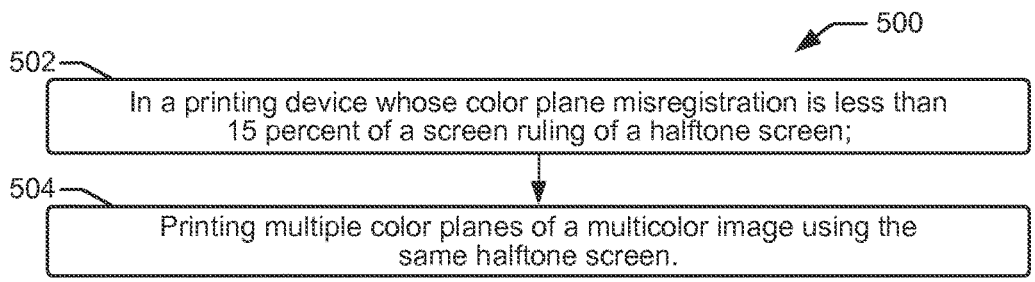
FIGS. 5, 6, 7, and 8 show flow diagrams that illustrate example methods related to providing rosette-free printing in a printing device.

Referring now to the flow diagram of FIG. 5, an example method 500 of providing rosette-free printing in a printing device begins at block 502, with the printing device having a color plane misregistration that is less than 15 percent of a screen ruling of a halftone screen. At block 504, the printing device prints multiple color planes of a multicolor image using the same halftone screen.

Figure 6:
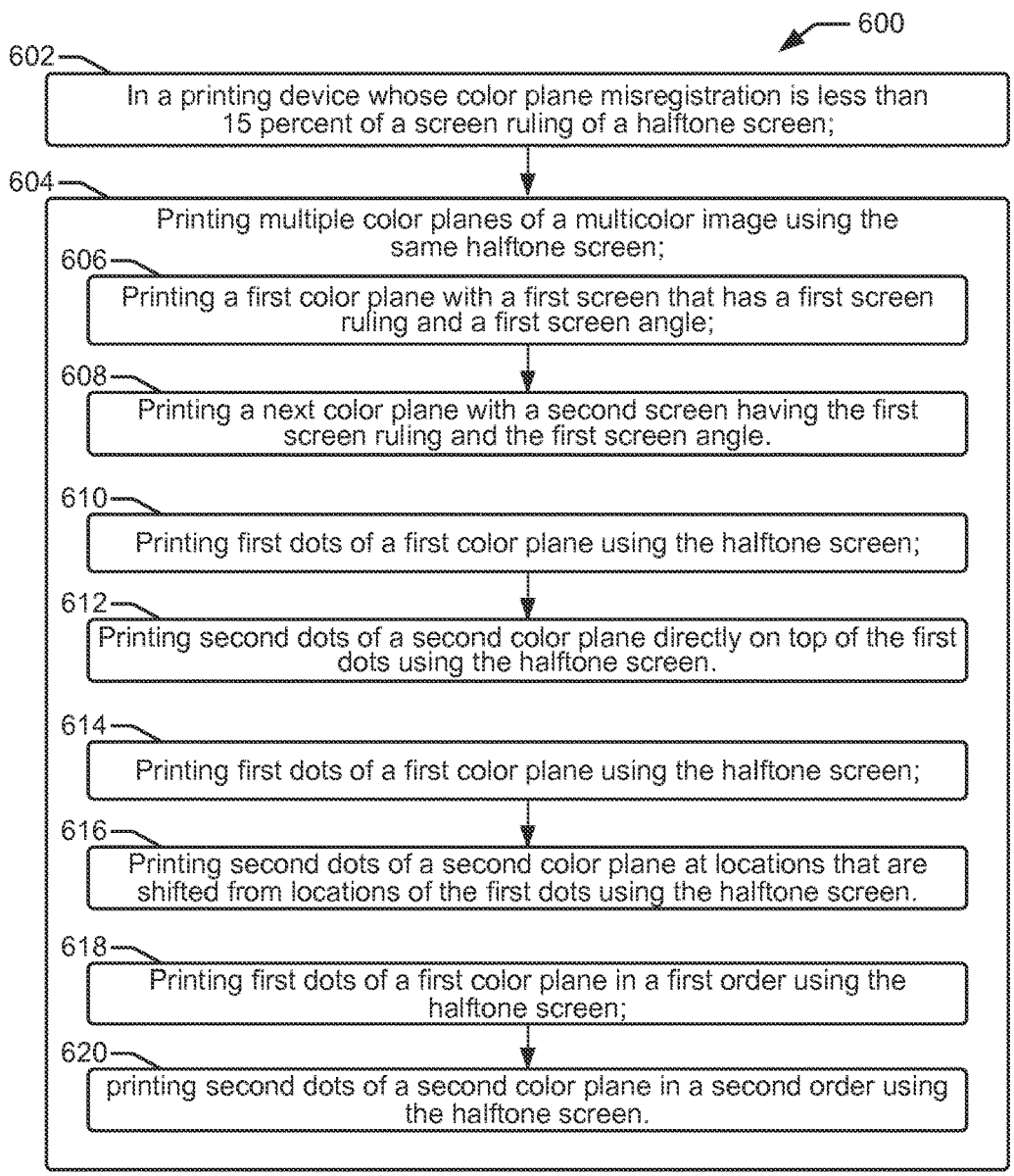
Figure 7:
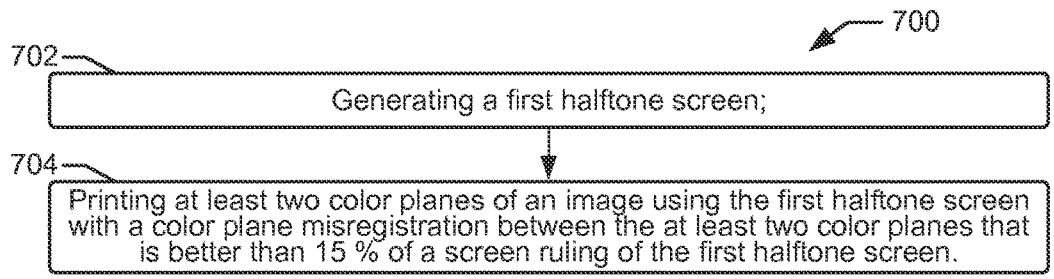
Figure 8:
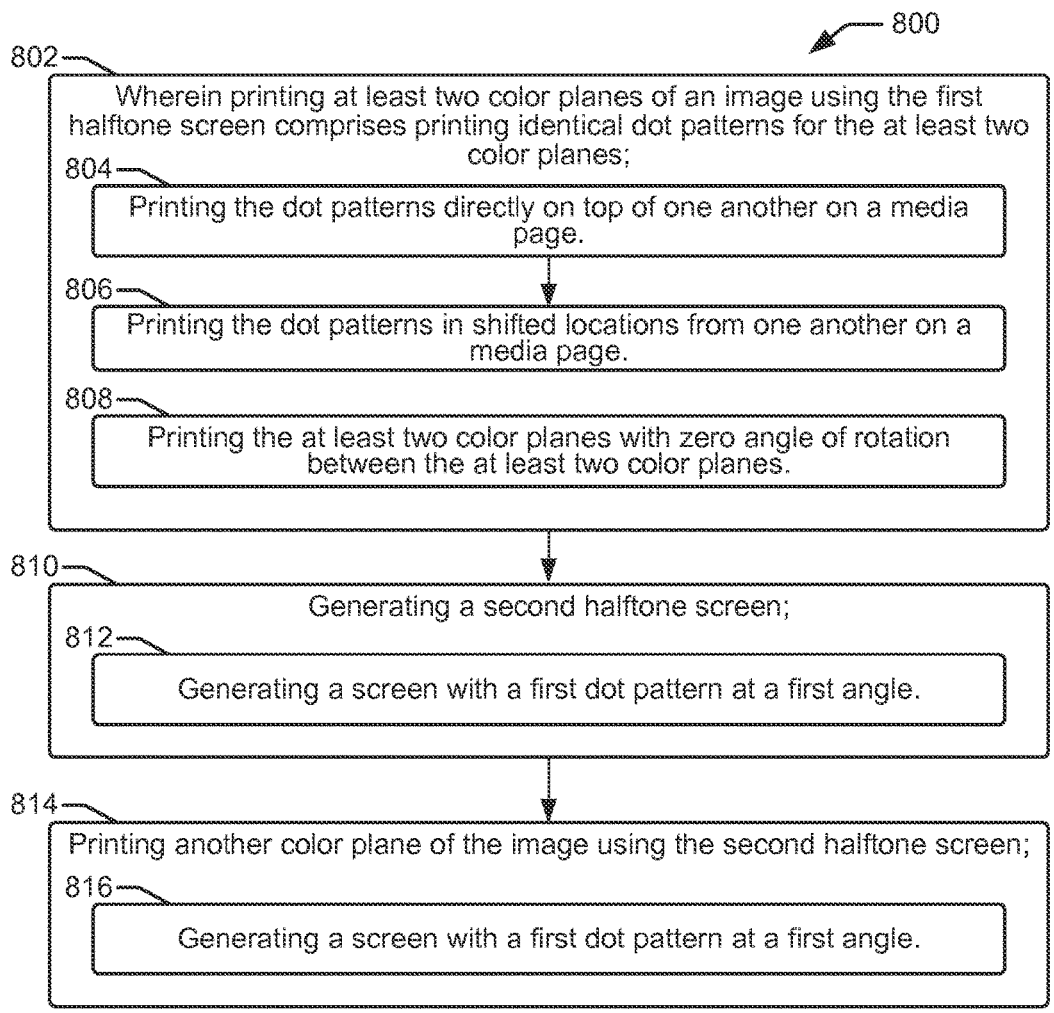

Referring now to the flow diagram of FIG. 6, an example method 600 of providing rosette-free printing in a printing device extends the method 500 with additional details and steps. Method 600 begins with a printing device having a color plane misregistration that is less than 15 percent of a screen ruling of a halftone screen, printing multiple color planes of a multicolor image using the same halftone screen, as shown at blocks 602 and 604. In some examples, printing multiple color planes of a multicolor image using the same halftone screen can include printing a first color plane with a first screen that has a first screen ruling and a first screen angle, and printing a next color plane with a second screen having the first screen ruling and the first screen angle, as shown at blocks 606 and 608. In some examples, printing multiple color planes of a multicolor image using the same halftone screen can also include printing first dots of a first color plane using the halftone screen, and printing second dots of a second color plane directly on top of the first dots using the halftone screen, as shown at blocks 610 and 612. In some examples, printing multiple color planes of a multicolor image using the same halftone screen can also include printing first dots of a first color plane using the halftone screen, and printing second dots of a second color plane at locations that are shifted from locations of the first dots using the halftone screen, as shown at blocks 614 and 616. In some examples, printing multiple color planes of a multicolor image using the same halftone screen can also include printing first dots of a first color plane in a first order using the halftone screen, and printing second dots of a second color plane in a second order using the halftone screen, as shown at blocks 618 and 620.

What is claimed is:

1. A method of rosette-free printing comprising:
   in a printing device whose color plane misregistration is less than 15 percent of a screen ruling of a halftone screen, printing each color plane of multiple color planes of a multicolor image using a single halftone screen, the single halftone screen being the same halftone screen used to print each of the other color planes.

2. A method as in claim 1, wherein printing each color plane of multiple color planes of a multicolor image using a single halftone screen comprises:
   printing a first color plane with a first screen that has a first screen ruling and a first screen angle; and
   printing a next color plane with a second screen having the first screen ruling and the first screen angle.

3. A method as in claim 1, wherein printing each color plane of multiple color planes of a multicolor image using a single halftone screen comprises:
   printing first dots of a first color plane using the single halftone screen; and,
   printing second dots of a second color plane directly on top of the first dots using the single halftone screen.

4. A method as in claim 1, wherein printing each color plane of multiple color planes of a multicolor image using a single halftone screen comprises:
   printing first dots of a first color plane using the single halftone screen; and,
   printing second dots of a second color plane at locations that are shifted from locations of the first dots using the single halftone screen.

5. A method as in claim 1, wherein printing each color plane of multiple color planes of a multicolor image using a single halftone screen comprises:
   printing first dots of a first color plane in a first order using the single halftone screen; and, printing second dots of a second color plane in a second order using the single halftone screen.

6. A printer for rosette-free printing comprising:
a stable color registration print engine;
a screen generator to create halftone screens; and
a screen manager to use a single and same halftone screen for printing all color planes of a multicolor image;
wherein the stable color registration print engine comprises a print engine to provide a color plane misregistration between the color planes of better than 15% of a screen ruling of the single and same halftone screen.

7. A non-transitory machine-readable storage medium storing instructions for rosette-free printing that when executed by a processor of a printing device, cause the printing device to:
generate a first halftone screen; and
print all color planes of a multicolor image using the first halftone screen with a color plane misregistration between the color planes that is better than 15% of a screen ruling of the first halftone screen.

8. A medium as in claim 7, wherein printing all color planes of a multicolor image using the first halftone screen comprises printing identical dot patterns for all the color planes.

9. A medium as in claim 8, wherein printing identical dot patterns for all the color planes comprises printing the dot patterns directly on top of one another on a media page.

10. A medium as in claim 8, wherein printing identical dot patterns for all the color planes comprises printing the dot patterns in shifted locations from one another on a media page.

11. A medium as in claim 8, wherein printing all color planes of a multicolor image using the first halftone screen comprises printing all the color planes with zero angle of rotation between all the color planes.

* * * * *